United States Patent [19]

Elder, Jr.

[11] Patent Number: 5,392,349

[45] Date of Patent: Feb. 21, 1995

[54] OVERVOLTAGE PROTECTION SCHEME FOR SUBSCRIBER LOOPS AND METHOD OF PERFORMING SAME

[75] Inventor: Joseph M. Elder, Jr., Boulder, Colo.

[73] Assignee: AT&T Corp., Murray Hill, N.J.

[21] Appl. No.: 885,098

[22] Filed: May 18, 1992

[51] Int. Cl.$^6$ ............................................. H04M 7/00
[52] U.S. Cl. .................................. 379/412; 379/413; 361/119
[58] Field of Search ................. 379/412, 413; 361/119

[56] References Cited

U.S. PATENT DOCUMENTS

| | | | |
|---|---|---|---|
| 4,709,296 | 11/1987 | Hung | 361/119 |
| 4,862,309 | 8/1989 | Tojo et al. | 379/412 |
| 4,896,352 | 1/1990 | Dabin | 379/412 |
| 4,905,119 | 2/1990 | Webb | 379/412 |
| 4,941,063 | 7/1990 | McCartney et al. | 379/412 |
| 4,947,427 | 8/1990 | Rosch et al. | 379/412 |
| 5,146,384 | 9/1992 | Markovic et al. | 379/412 |
| 5,161,183 | 11/1992 | Maytum | 379/413 |

OTHER PUBLICATIONS

"PBX Line Interface Circuit Design Using The LH1208AAJIC", Application Note, AT&T Microelectronics, Apr. 1991, pp. 1-11.
"LH1208AAJ/AAR PBX Switch Set", Preliminary Data Sheet, AT&T, Jul. 1990 pp. 1-19.

Primary Examiner—James L. Dwyer
Assistant Examiner—Jacques M. Saint-Surin
Attorney, Agent, or Firm—Scott W. NcLellan

[57] ABSTRACT

By opening switches coupling a subscriber loop to circuits in a SLIC when an overvoltage condition occurs, the SLIC is protected from damage. The overvoltage is detected by a overvoltage protector behind the switches. The overvoltage condition is latched and the common control is notified of the condition. The common control may then clear the latch, reclosing the switches. If the overvoltage still exists, the switches are re-opened and maintenance personnel is notified of the fault.

12 Claims, 3 Drawing Sheets

OVERVOLTAGE DETECT

OVERVOLTAGE PROTECTION SCHEME FOR SUBSCRIBER LOOPS AND METHOD OF PERFORMING SAME

BACKGROUND OF THE INVENTION

1. Field of the Invention

This invention relates to telephony systems in general and, more particularly, to protecting subscriber loop interface circuits from overvoltage.

2. Description of the Prior Art

A telephone system, such as an electronic switching system (ESS) or a private branch exchange (PBX), use subscriber line interface circuits (SLICs) to act as an interface between the system and pairs of wires (subscriber loops) to telephone sets. The SLICs provide a variety of well-known functions, some of which are battery feed, ringing, supervision, and message waiting. The functions are generally under the control of a common control in the system.

Early systems utilized relays, inductors, transformers, resistors, capacitors, fuses, and other passive components to implement the above functions. These components are relatively immune from overvoltage stress that may occur, such as lightning strikes or power line cross.

Gradually, as more and more solid state components were added to replace the relays, transformers, etc., the susceptibility of the SLIC to overvoltage stress grew to the point where old protection schemes (e.g., carbon block and gas tube protectors) were insufficient. New schemes (varistors, positive temperature coefficient current limiters, Zener diodes, etc.) were devised to meet the requirements for the newer generations of SLICs.

The push for integrating as much of the SLIC circuitry into one or two chips has again make older overvoltage protection schemes inadequate in many instances. Either the old schemes do not sufficiently protect the integrated SLICs, or the cost and physical size of adequate protection schemes are too much for competitively priced telephone systems to support.

A new approach is needed to provide adequate overvoltage stress protection that is low in cost and physical size. It would be advantageous that the protection be compatible with integrated circuits or be partially integratable with the same circuits that are to be protected.

SUMMARY OF THE INVENTION

This and other aspects of the invention may be obtained generally in a subscriber line interface circuit for use in a telephone system. The circuit has first and second pairs of terminals, the first pair of terminals for coupling to a pair of wires; a first switch, having a control input, for coupling a first terminal of the first pair of terminals to a first terminal in the second pair of terminals; and an overvoltage detector coupling to the second pair of terminals. The circuit is characterized by means, coupling to the control input of the switch, for opening the first switch in response to the overvoltage detector detecting an overvoltage.

The aspects of the invention may also obtained generally by a method of protecting a telephone system having a subscriber interface circuit. The circuit has: first and second pairs of terminals, the first pair for coupling to a pair of wires; and a switch, having a control input, for coupling a first terminal of the first pair of terminals to a first terminal of the second pair of terminals. The method is characterized by the steps of: detecting an overvoltage if a voltage on the second pair of terminals exceeds a predetermined voltage; and opening the switch inn response to the overvoltage.

The foregoing allows for alerting maintenance personnel of a service disruption without the need for a subscriber to report the service disruption. In addition, the alert may serve as a warning to the personnel that a potentially dangerous condition may exist.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
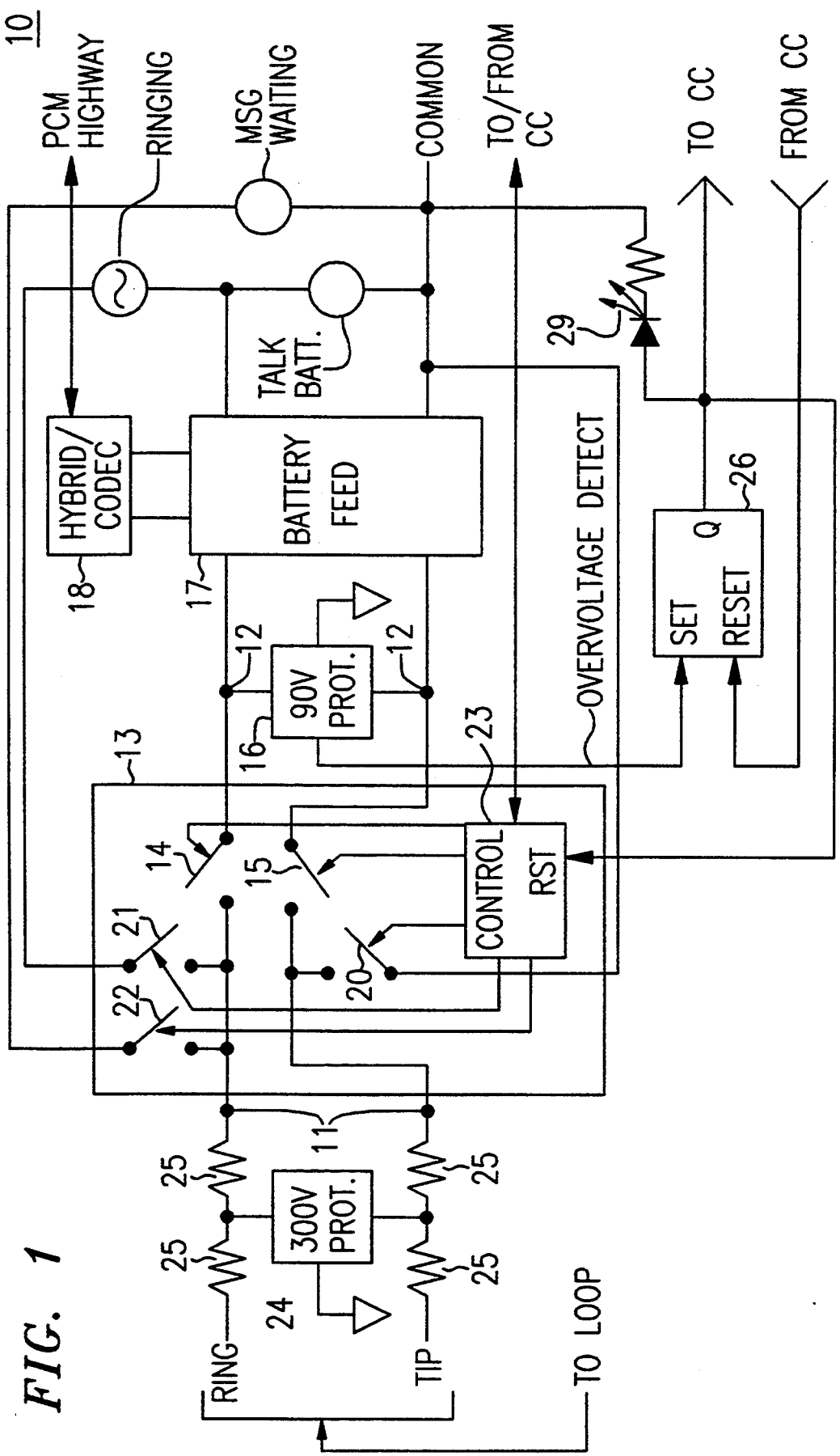
FIG. 1 is simplified schematic diagram of a subscriber line interface circuit (SLIC) according to one embodiment of the invention.

In FIG. 1, an exemplary subscriber line interface circuit (SLIC) 10 is shown for use in telephone systems. The SLIC 10 basically couples a subscriber's telephone (not shown) via a pair of wires (not show), called a loop, to the switching equipment within the system (not shown). The SLIC 10 has a first pair of terminals, or nodes, 11 and a second pair of terminals 12. In finis example, a chip 13 has switches 14, 15 for coupling the first pair of terminals 11 to the second pair of terminals 12. A 90 volt protector/detector circuit 16 detects if voltages on the terminals 12 exceed a predetermined voltage (hem, about 90 volts) as well as clamping the voltages on the terminals 12 to the predetermined voltage. When an overvoltage is detected by protector/detector 16, the switches 14, 15 are opened to protect the SLIC 10.

In more detail, the SLIC 10 utilizes a chip 13, commonly known as a switch set chip, to switch various signals onto or from the subscriber loop. An exemplary switch set chip 13 is an AT&T LH1208AAJ/AAR PBX switch set, manufactured by AT&T Microelectronics, of Reading Pa. Details concerning the use and operation of the LH1208AAJ/AAR may be obtained from the data sheet and application note publications (publication numbers DS90-041HVIC and AP91-002HVIC, respectively) available from AT&T Microelectronics, 555 Union Boulevard, Allentown, Pa., and incorporated herein by reference. For purposes here, the chip 13 couples current from a battery feed circuit 17, such as an AT&T LB 1276AF battery feed chip (also discussed in the above-referenced publications), to the tip and ring connections of the subscriber loop. The battery feed 17 may also couple to a hybrid/CODEC arrangement 18 for coupling voice signals to a multiplexed digital pathway (PCM highway) for further processing by the telephone switching equipment. The switch set chip 13 also includes switches 20, 21, and 22 for coupling ringing voltage mid message waiting battery to the subscriber loop. All the switches 14, 15, 20–22 in switch set chip 13 are controlled by on-chip control circuitry 23, which is controlled by the common control (CC), such as a computer, which may control the entire switching system. A reset (RST) input is provided on switch set chip 13 to force the switches thereon to open independently of commands from the CC. In addition to the 90 volt protector/detector 16, a 300 volt protector 24 clamps voltages on terminals 11 (which connect to the subscriber loop) typically when switches in the switch set chip 13 are open. Typically, the clamping voltage of the protector 24 is significantly greater than the clamping voltage of the protector/detector 16 since the ringing voltage must pass protector 24 without attenuation. However, voltages of this magnitude would damage the battery feed 17. Therefore, the clamping voltages of protectors 24 and 16 are chosen such that a line cross (such as a 120 volts AC) will cause protector/detector 16 to clamp while protector 24 does not. Resistors 25 help dissipate excess energy when the protectors 12, 24 are clamping to limit dissipation in the protectors. It is understood that some of the resistors 25 may be fuses to prevent destruction of the protector 24 if an overvoltage of sufficient magnitude is impressed on the loop (here, greater than 300 volts) with sufficient current to damage the protector 24 if current limiting/interruption is not used.

During normal operation of the SLIC 10, switches 14, 15 are closed in response to a signal from the common control to apply current to the loop and, thus, to a subscriber set attached to the loop. While the switches 14, 15 are closed, if an overvoltage condition should develop across the loop, the 90 volt protector/detector 16 would normally clamp the voltages to approximately that voltage. A prior art SLIC would allow the protector/detector 16 to conduct until resistors 25 fail (one or more of the resistors 25 may be a fuse) or the protector/detector 16 itself fails, possibly destroying other circuitry in the SLIC. However, in the exemplary embodiment, the protector/detector 16 indicates that an overvoltage condition exists and sets flip-flop 26 which, in turn, forces the switches 14 and 15 (and any other switch 20-22 which may be closed) to open. The protector/detector 16 will be discussed in more detail in connection with FIG. 2. In addition to flip-flop 26 forcing the switches in switch set chip 13 to open, the CC is notified of a fault condition. The CC may, after a predetermined amount of time, clear the flip-flop 26, and close switches 14 and 15 if necessary, to see if the overvoltage still exists. If the overvoltage does still exists, the protector/detector 16 again sets flip-flop 26, opening the switches in switch set chip 13. The CC may then send a message to maintenance personnel that a fault condition exists with respect to the loop connected to the faulted SLIC 10. In addition, the output of flip-flop 26 may drive an indicator 29 (here an LED) to visually alert personnel. Thus, maintenance personnel are alerted to a fault and are warned that dangerous voltages may exist on the loop connected to the faulted SLIC.

Figure 2:
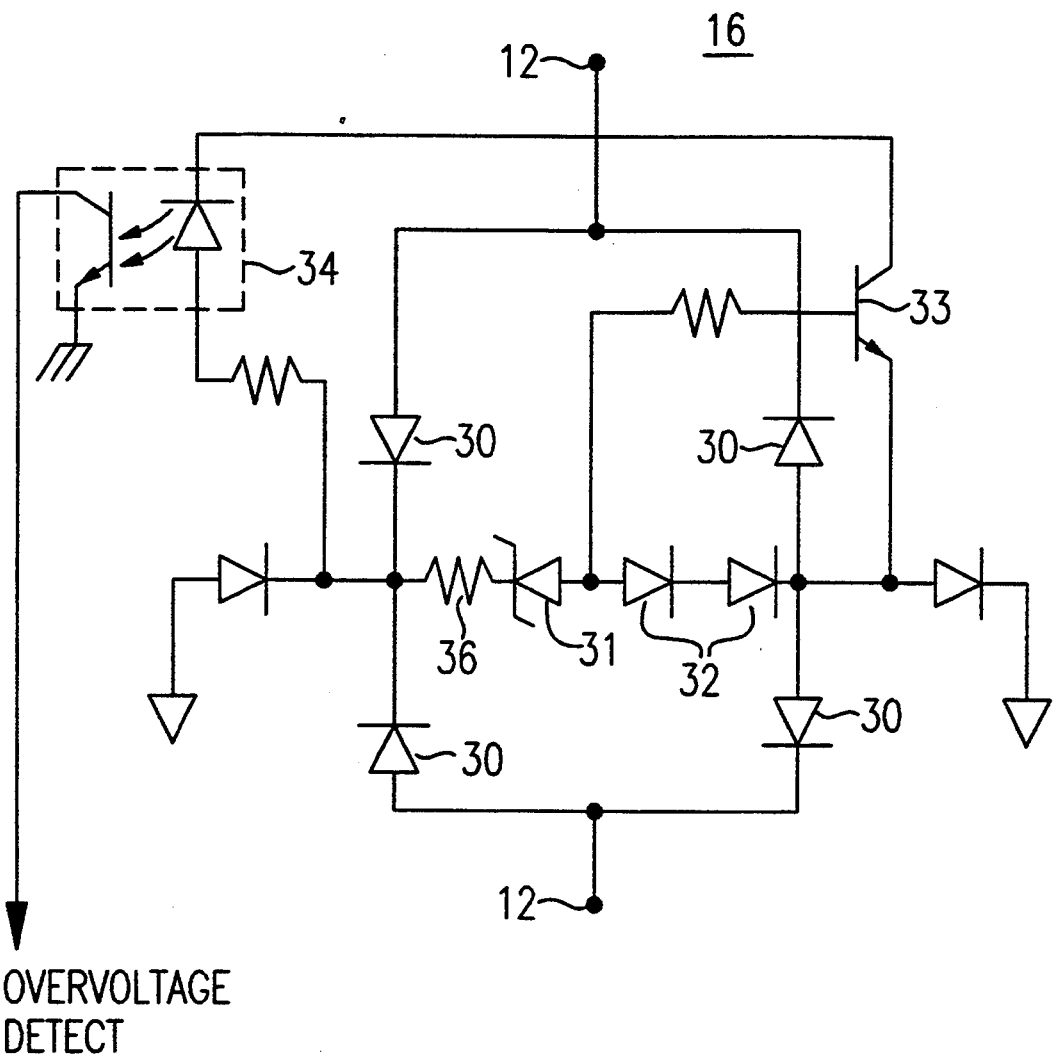
FIG. 2 is a simplified circuit diagram of an exemplary overvoltage protector/detector with an output indicating an overvoltage condition.

In FIG. 2, an exemplary, simplified, Schematic diagram of the protector/detector 16 is shown. Briefly, the protector/detector 16 utilizes a bridge rectifier of diodes 30 to impress the voltages from the terminals 12 across Zener diode 31 and series coupled diodes 32. Diode 3 substantially determines the clamping voltage for the protector/detector 16 while diodes 32 drop sufficient voltage to turn-on transistor 33 when sufficient current flows through the protector/protector 16. Upon transistor 33 "turning on", current flows through a light emitting diode (not numbered) in opto-isolator 34 to make a photo-sensitive transistor (not numbered) therein conduct. Thus, when the transistor in the optoisolator 34 conducts, the protector/protector 16 is clamping voltage on the terminals 12, indicating that the voltage on at least one of the terminals 12 has exceeded a predetermined voltage.

It is understood that the clamping function and the overvoltage detection function of protector/detector 16 may be accomplished by separate circuits. For example, if the resistance of current limiting resistor 36, in series with Zener diode 31, is sufficiently small (e.g., less than 100 ohms), then protector/detector 16 effectively clamps voltages on terminals 12. If, however, the resistance of current limiting resistor 36 is sufficiently large (e.g., greater than 10 kilo-ohms), the protector/detector 16 does not effectively limit voltage yet still provides effective overvoltage detection. Alternatively, current limiting resistor 36 may be replaced with other current limiting means, such as a depletion type FET with the gate coupled to the source thereof to form a approximate constant current source to limit the current through the Zener diode 31 to the $I_{DSS}$ of the FET or less.

Figure 3:
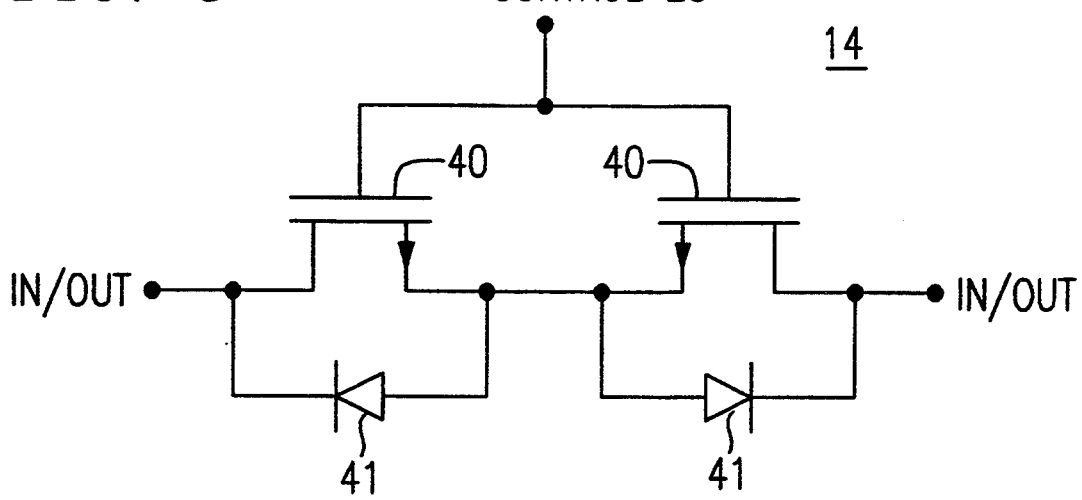
FIG. 3 is a simplified schematic diagram of an exemplary switch used in the SLIC of FIG. 1 or FIG. 4.

An exemplary switch 14 from the swish set chip 13 is shown in a simplified schematic form in FIG. 3. Two series coupled DMOS transistors 40, along with corresponding integral protection diodes 41, form a bidirectional conduction path when the control input is biased ! sufficiently to assure one or both of the transistors 40 are conducting.

Figure 4:
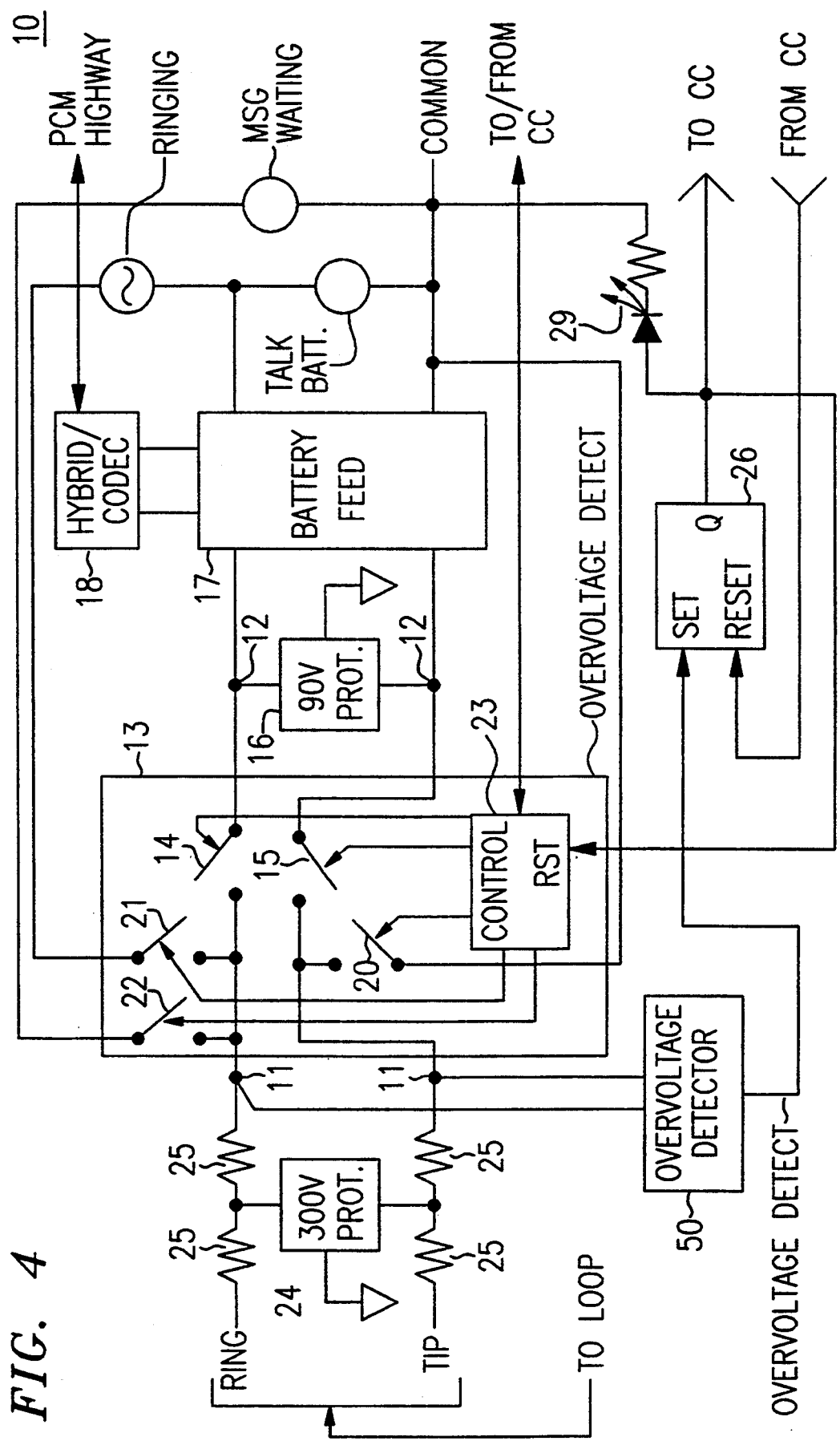
FIG. 4 is a simplified schematic diagram of a SLIC according to another embodiment of the invention.

An alternative SLIC design is shown in FIG. 4. In this case, the overvoltage detection function is performed by a: detector 50 coupled to the first pair of terminals 11. As in the case of the SLIC shown in FIG. 1, upon detection of an overvoltage, flip-flop 26 is set, the CC notified, and the switches in switch set chip 13 are opened until the CC resets the flip-flop 26. This is substantially similar to the operation of the SLIC 10 discussed in connection with FIG. 1. The circuitry of detector 50 may be similar to the protector/detector 16 circuitry shown in FIG. 2 provided that the resistance of the current limiting resistor 36 (or other current limiting means as discussed above) is sufficient to limit the current therein such that the detector 50 does not substantially clamp voltages on terminals 11.

It is understood that other embodiments of the invention may be made. In particular, the predetermined clamping voltages for the protector may be different from that disclosed. Further, the switches may be relays or discrete transistors instead of an integrated solid state design and still map the benefit of the invention. Further, much of the circuitry disclosed herein may be disposed on an integrated circuit. For example, flip-flop 26 (FIG. 1) may be combined onto the switch set chip 13.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

I claim:

1. A subscriber line interface circuit (SLIC) for use in a telephone system, having:

first and second pairs of terminals, the first pair of terminals for coupling to a pair of wires, the second pair of terminals coupling to the SLIC;

a first switch, having a control input, for coupling a first terminal of the first pair of terminals to a first terminal in the second pair of terminals;

a second switch, having a control input responsive to the means, for coupling a second terminal of the fist pair of terminals to a second terminal of the second pair of terminals;

CHARACTERIZED BY:

an overvoltage detector coupling to the second pair of terminals; and a storage element, responsive to the overvoltage detector and having an output coupled to the control inputs of the switches;

wherein the storage element holds the detection of the overvoltage condition to keep the switches open in response thereto.

2. The subscriber line interface circuit as recited in claim 1, wherein the storage element is a flip-flop.

3. The subscriber line interface circuit as recited in claim 1, further characterized by the overvoltage detector including a first voltage limiter for clamping the voltage on the second pair of terminals to a first predetermined voltage.

4. The subscriber line interface circuit as recited in claim 3, further characterized by a second voltage limiter, coupling to the first pair of terminals, for clamping a voltage on the first pair of terminals to a second predetermined voltage greater than the first predetermined voltage.

5. The subscriber line interface circuit as recited in claim 4, further characterized by a third switch, having a control input responsive to the means, for coupling a source of ringing voltage to the first terminal in the first pair of terminals.

6. The subscriber line interface circuit as recited in claim 5, further characterized by a battery feed circuit coupling to the second pair of terminals.

7. The subscriber line interface circuit as recited in claim 6, further characterized by an indicator coupling to the output of the storage element, for visually indicating if the overvoltage condition exists.

8. In a telephone system, a method of protecting a subscriber interface circuit (SLIC), the circuit including:

first and second pairs of terminals, the first pair for coupling to a pair of wires, and the second pair coupling to the SLIC;

switches, having a control input, for coupling terminals of the first pair of terminals to respective terminals of the second pair of terminals;

CHARACTERIZED BY THE STEPS OF:

detecting an overvoltage if a voltage on the second pair of terminals exceeds a predetermined voltage; and opening the switch in response to the overvoltage for a predetermined amount of time.

9. The method as recited in claim 8, further characterized by the steps of:

closing the switch after the predetermined amount of time;

detecting if an overvoltage remains; and opening the switch if the overvoltage exits.

10. The method as recited in claim 9, further characterized by the steps of:

latching the detection of an overvoltage; and indicating the latched detection of an overvoltage to a common control.

11. The method as recited in claim 10, wherein the switch is controlled by the latched detection of an overvoltage.

12. The method as recited in claim 11, further characterized by the step of visually indicating the detection of an overvoltage.

* * * * *